(12) United States Patent
Martin et al.

(10) Patent No.: US 10,182,441 B2
(45) Date of Patent: Jan. 15, 2019

(54) TELECOMMUNICATIONS APPARATUS AND METHODS

(71) Applicant: SONY CORPORATION, Tokyo (JP)

(72) Inventors: Brian Alexander Martin, Basingstoke (GB); Dimitris Koulakiotis, Basingstoke (GB); Jussi Tapani Kahtava, Basingstoke (GB); Anders Berggren, Lund (SE); Rickard Ljung, Helsingborg (SE); Peter C. Karlsson, Lund (SE); Lars Nord, Lund (SE)

(73) Assignee: SONY CORPORATION, Tokyo (JP)

( * ) Notice: Subject to any disclaimer, the term of this patent is extended or adjusted under 35 U.S.C. 154(b) by 62 days.

(21) Appl. No.: 15/314,430

(22) PCT Filed: May 21, 2015

(86) PCT No.: PCT/EP2015/061297
§ 371 (c)(1),
(2) Date: Nov. 28, 2016

(87) PCT Pub. No.: WO2015/185369
PCT Pub. Date: Dec. 10, 2015

(65) Prior Publication Data
US 2017/0196009 A1 Jul. 6, 2017

(30) Foreign Application Priority Data
Jun. 5, 2014 (EP) .................... 14171284

(51) Int. Cl.
*H04W 72/04* (2009.01)
*H04W 16/14* (2009.01)
*H04W 72/08* (2009.01)

(52) U.S. Cl.
CPC ....... *H04W 72/0453* (2013.01); *H04W 16/14* (2013.01); *H04W 72/085* (2013.01)

(58) Field of Classification Search
CPC . H04W 4/00; H04W 72/1231; H04W 72/042; H04W 48/08; H04W 72/12; H04L 1/0026; H04L 5/0098
See application file for complete search history.

(56) References Cited

U.S. PATENT DOCUMENTS

| 8,489,105 | B2 * | 7/2013 | Choi ..................... H04W 48/08 370/329 |
| 8,665,813 | B2 * | 3/2014 | Golitschek Edler Von Elbwart ................ H04L 1/0026 370/329 |

(Continued)

FOREIGN PATENT DOCUMENTS

| EP | 2 360 866 A1 | 8/2011 |
| EP | 2 696 530 A2 | 2/2014 |
| WO | 2012/116489 A1 | 9/2012 |

OTHER PUBLICATIONS

Office Action dated Nov. 29, 2017 in European Patent Application No. 15 724 292.6.

(Continued)

*Primary Examiner* — Hanh N Nguyen
(74) *Attorney, Agent, or Firm* — Xsensus LLP

(57) ABSTRACT

A method of operating a terminal device and network infrastructure equipment in a wireless telecommunications system for communicating on a primary cell supporting a primary component carrier on radio resources within a first frequency band and a secondary cell supporting a secondary component carrier on radio resources within a second frequency band. The infrastructure equipment establishes plural configuration settings for the secondary carrier based on measurements of radio usage in the second frequency band, which are conveyed to the terminal device. The terminal device makes channel quality measurements for the secondary component carrier according to the different configura- (Continued)

tion settings and reports these to the infrastructure equipment. Based on the measurements of channel quality for the different configurations, the infrastructure equipment selects one of the configuration settings, and conveys an indication of this to the terminal device in association with an allocation of transmission resources on the secondary component carrier.

21 Claims, 5 Drawing Sheets

(56) References Cited

U.S. PATENT DOCUMENTS

| | | | |
|---|---|---|---|
| 9,258,811 B2* | 2/2016 | Koskela | H04W 72/042 |
| 9,474,089 B2* | 10/2016 | Wei | H04L 5/0098 |
| 2013/0165134 A1 | 6/2013 | Touag et al. | |
| 2013/0336156 A1 | 12/2013 | Wei et al. | |
| 2014/0044105 A1 | 2/2014 | Bontu et al. | |

OTHER PUBLICATIONS

Extended European Search Report dated Jun. 30, 2017 in Patent Application No. 17172750.6.
Harri Holma, et al., "LTE for UMTS of DMA and SC-FDMA Based Radio Access", John Wiley and Sons, Total 4 Pages, (2009).
"LTE; Evolved Universal Terrestrial Radio Access (E-UTRA); Physical channels and modulation (3GPP TS 36.211 version 11.5.0 Release 11)", ETSI TS 136 211, V11.5.0, Total 122 Pages, (Jan. 2014).
"LTE; Evolved Universal Terrestrial Radio Access (E-UTRA); Multiplexing and channel coding (3GPP TS 36.212 version 11.4.0 Release 11)", ETSI TS 136 212, V11.4.0, Total 86 Pages, (Jan. 2014).
"LTE; Evolved Universal Terrestrial Radio Access (E-UTRA); Physical layer procedures (3GPP TS 36.213 version 11.6.0 Release 11)", ETSI TS 136 213, V11.6.0, Total 184 Pages, (Mar. 2014).
"LTE; Evolved Universal Terrestrial Radio Access (E-UTRA); Medium Access Control (MAC) protocol specification (3GPP TS 36.321 version 11.5.0 Release 11)", ETSI TS 136 321, V11.5.0, Total 59 Pages, (Mar. 2014).
LTE; Evolved Universal Terrestrial Radio Access (E-UTRA); Radio Resource Control (RRC); Protocol specification (3GPP TS 36.331 version 11.7.0 Release 11), ETSI TS 136 331, V11.7.0, Total 354 Pages, (Mar. 2014).
International Search Report dated Aug. 3, 2015 in PCT/EP15/061297 filed May 21, 2015.
Final Office Action issued in Korean Patent Application 10-2016-7033386 dated Sep. 10, 2018.
EP Office Action dated Nov. 16, 2018, issued in European Patent Application No. 17 172 750.6.

* cited by examiner

TELECOMMUNICATIONS APPARATUS AND METHODS

BACKGROUND

Field

The present disclosure relates to mobile communications networks and methods for communicating data using mobile communications networks, infrastructure equipment for mobile communications networks, communications devices for communicating data via mobile communications networks and methods of communicating via mobile communications networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well known in the field of wireless telecommunications for regions of the radio spectrum to be assigned to different mobile network operators (MNO) for their exclusive use through a license. A license typically grants an MNO exclusive use over a number of years of a predefined portion of the radio frequency spectrum in which to deploy a mobile communications network (e.g. GSM, WCDMA/HSPA, LTE/LTE-A). As a result of this approach, an operator has guarantees of no other radio services interfering with the radio resources that have been assigned to the operator, and within the limitations of the license conditions it has exclusive control over what radio technology it deploys in the network. Consequently, a wireless telecommunications system that is primarily designed to operate using radio resources that have been licensed for exclusive use by the wireless telecommunications system can operate with a degree of centralised control and coordination to help make most efficient use of the available radio resources. Such a wireless telecommunication system also manages all the interference internally, based on standard specifications, since the licence grants it good immunity from external interference sources. Coexistence of different devices deployed on an MNO's licensed band is managed through conformance to relevant radio standards. Licensed spectrum is today usually assigned to operators via government-organised auctions, but so-called "beauty contests" continue also to be in use.

It is also well known in the field of wireless telecommunications for regions of the available radio spectrum to remain unlicensed. Unlicensed (licence exempt) radio spectrum may, at least to some extent, be freely used by a number of different technologies, such as Wi-Fi and Bluetooth and other non-3GPP radio access technologies. Operating parameters for devices using unlicensed spectrum bands are typically stipulated by technical regulatory requirements such as e.g. the FCC Part 15 rule for 2.4 GHz ISM band. Coexistence of different devices deployed on unlicensed band, due to the lack of centralised coordination and control, is usually based on such technical rules and various politeness protocols.

The use of wireless telecommunications system technologies designed for operation on licensed radio spectrum, such as LTE, is becoming more and more prevalent, both in terms of increasing take-up of established uses for wireless telecommunications technologies, and also the introduction of new uses, e.g., in the developing field of machine-type communications (MTC). In order to help provide more bandwidth to support this increased use of wireless telecommunications technologies, it has recently been proposed to use unlicensed radio spectrum resources to support operations on licensed radio spectrum.

However, in contrast to licensed spectrum, unlicensed spectrum can be shared and used among different technologies, or different networks using the same technology, without any co-ordinated/centralised control, for example to provide protection against interference. As a consequence of this, the use of wireless technologies in unlicensed spectrum can be subject to unpredictable interference and has no guarantees of spectrum resources, i.e. the radio connection takes place on a best effort basis. This means that wireless network technologies, such as LTE, which are generally designed to operate using licensed radio resources, require modified approaches to allow them to efficiently use unlicensed radio resources, and in particular to co-exist reliably and fairly with other radio access technologies that may be simultaneously operating in the unlicensed spectrum band.

Therefore, deploying a mobile radio access technology system primarily designed to operate in licensed spectrum bands (i.e. having exclusive access to, and hence a level of control over, the relevant radio resources) in a manner which is required by operation in unlicensed spectrum bands (i.e. without having exclusive access to at least some of the relevant radio resources), gives rise to new technical challenges.

SUMMARY

According to an aspect of the disclosure there is provided a method of operating a terminal device in a wireless telecommunications system for communicating with network infrastructure equipment on a primary cell supporting a primary component carrier on radio resources within a first frequency band and a secondary cell supporting a secondary component carrier on radio resources within a second frequency band, wherein the method comprises: receiving from the network infrastructure equipment an indication of a plurality of potential configuration settings for the secondary component carrier; receiving from the network infrastructure equipment an allocation message indicating an allocation of transmission resources to be used for communicating data between the network infrastructure equipment and the terminal device on the secondary component carrier; receiving from the network infrastructure equipment in association with the allocation message an indication of a selected one of the plurality of potential configuration settings for the secondary component carrier to be used for communicating the data; and receiving the data from the network infrastructure equipment using the allocated resources on the secondary component carrier operating in accordance with the selected one of the plurality of potential configuration settings.

According to another aspect of the disclosure there is provided a terminal device for use in a wireless telecommunications system for communicating with network infrastructure equipment on a primary cell supporting a primary component carrier on radio resources within a first frequency band and a secondary cell supporting a secondary component carrier on radio resources within a second frequency band, wherein the terminal device comprises a controller unit and a transceiver unit configured to operate together to: receive from the network infrastructure equipment an indication of a plurality of potential configuration settings for the secondary component carrier; receive from the network infrastructure equipment an allocation message indicating an allocation of transmission resources to be used for communicating data between the network infrastructure equipment and the terminal device on the secondary component carrier; receive from the network infrastructure equipment in association with the allocation message an indication of a selected one of the plurality of potential configuration settings for the secondary component carrier to be used for communicating the data; and receive the data from the network infrastructure equipment using the allocated resources on the secondary component carrier operating in accordance with the selected one of the plurality of potential configuration settings.

According to another aspect of the disclosure there is provided circuitry for a terminal device for use in a wireless telecommunications system for communicating with network infrastructure equipment on a primary cell supporting a primary component carrier on radio resources within a first frequency band and a secondary cell supporting a secondary component carrier on radio resources within a second frequency band, wherein the circuitry comprises a controller element and a transceiver element configured to operate together to: receive from the network infrastructure equipment an indication of a plurality of potential configuration settings for the secondary component carrier; receive from the network infrastructure equipment an allocation message indicating an allocation of transmission resources to be used for communicating data between the network infrastructure equipment and the terminal device on the secondary component carrier; receive from the network infrastructure equipment in association with the allocation message an indication of a selected one of the plurality of potential configuration settings for the secondary component carrier to be used for communicating the data; and receive the data from the network infrastructure equipment using the allocated resources on the secondary component carrier operating in accordance with the selected one of the plurality of potential configuration settings.

According to another aspect of the disclosure there is provided a method of operating network infrastructure equipment in a wireless telecommunications system for communicating with a terminal device on a primary cell supporting a primary component carrier on radio resources within a first frequency band and a secondary cell supporting a secondary component carrier on radio resources within a second frequency band, wherein the method comprises: transmitting to the terminal device an indication of a plurality of potential configuration settings for the secondary component carrier; transmitting to the terminal device an allocation message indicating an allocation of transmission resources to be used by for communicating data to the terminal device on the secondary component carrier; transmitting to the terminal device in association with the allocation message an indication of a selected one of the plurality of potential configuration settings for the secondary component carrier to be used for communicating the data; and transmitting the data to the terminal device using the allocated resources on the secondary component carrier operating in accordance with the selected one of the plurality of potential configuration settings.

According to another aspect of the disclosure there is provided network infrastructure equipment for use in a wireless telecommunications system for communicating with a terminal device on a primary cell supporting a primary component carrier on radio resources within a first frequency band and a secondary cell supporting a secondary component carrier on radio resources within a second frequency band, wherein the network infrastructure equipment comprises a controller unit and a transceiver unit configured to operate together to: transmit to the terminal device an indication of a plurality of potential configuration settings for the secondary component carrier; transmit to the terminal device an allocation message indicating an allocation of transmission resources to be used by for communicating data to the terminal device on the secondary component carrier; transmit to the terminal device in association with the allocation message an indication of a selected one of the plurality of potential configuration settings for the secondary component carrier to be used for communicating the data; and transmit the data to the terminal device using the allocated resources on the secondary component carrier operating in accordance with the selected one of the plurality of potential configuration settings.

According to another aspect of the disclosure there is provided circuitry for network infrastructure equipment for use in a wireless telecommunications system for communicating with a terminal device on a primary cell supporting a primary component carrier on radio resources within a first frequency band and a secondary cell supporting a secondary component carrier on radio resources within a second frequency band, wherein the circuitry comprises a controller element and a transceiver element configured to operate together to: transmit to the terminal device an indication of a plurality of potential configuration settings for the secondary component carrier; transmit to the terminal device an allocation message indicating an allocation of transmission resources to be used by for communicating data to the terminal device on the secondary component carrier; transmit to the terminal device in association with the allocation message an indication of a selected one of the plurality of potential configuration settings for the secondary component carrier to be used for communicating the data; and transmit the data to the terminal device using the allocated resources on the secondary component carrier operating in accordance with the selected one of the plurality of potential configuration settings.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
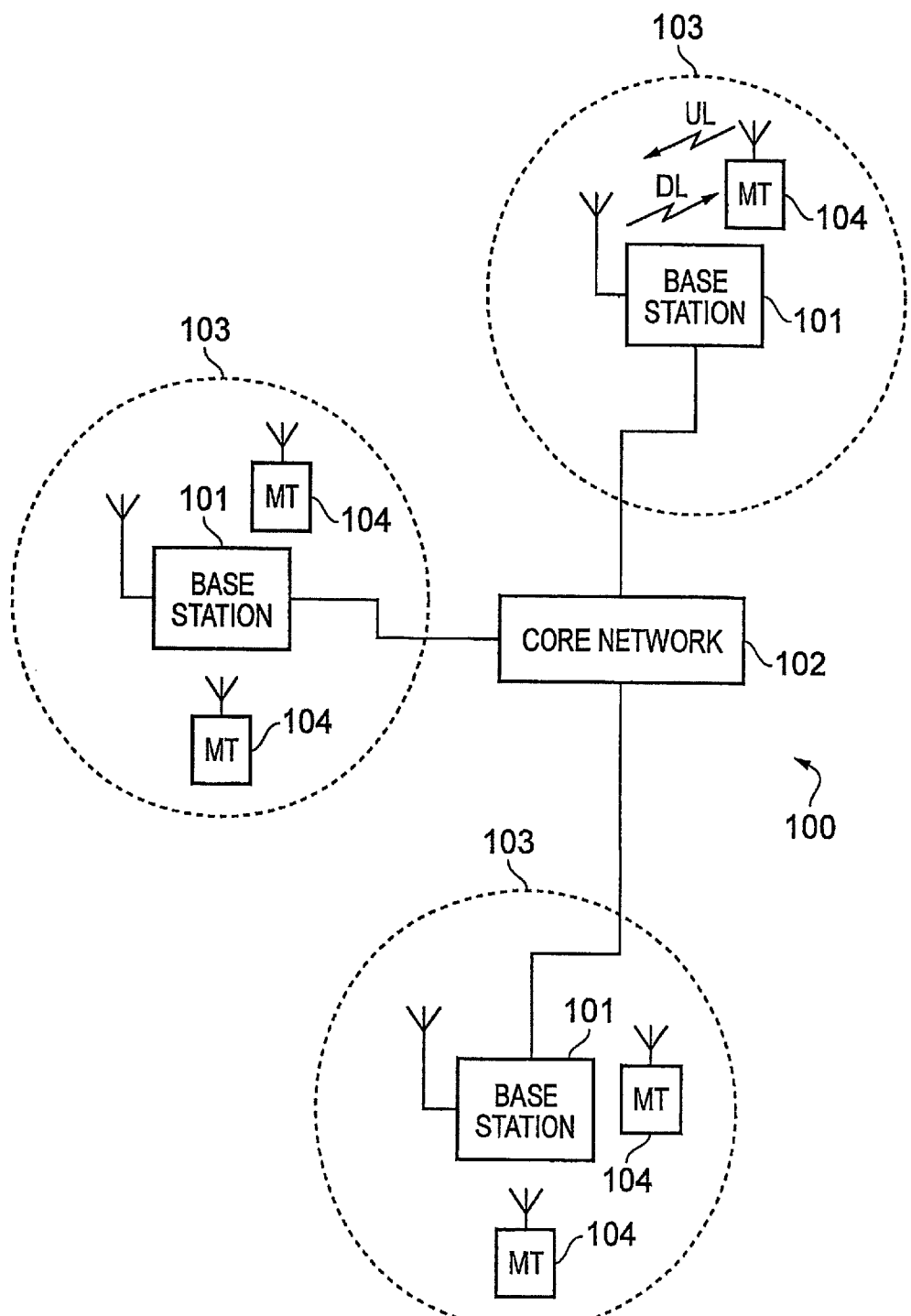
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licenced for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Figure 2:
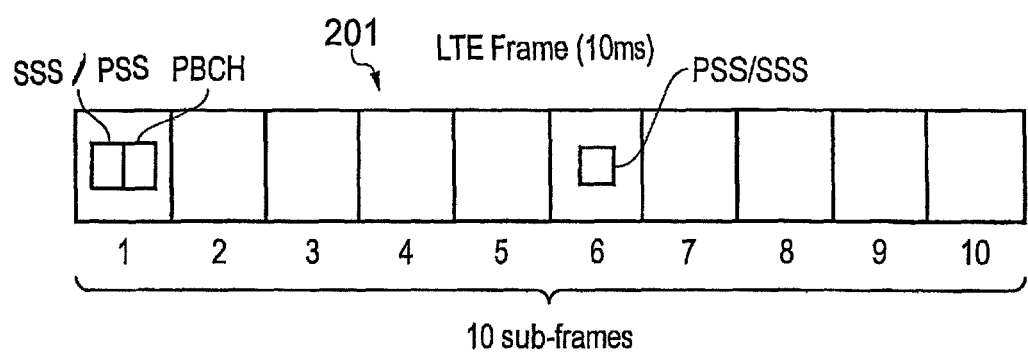
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
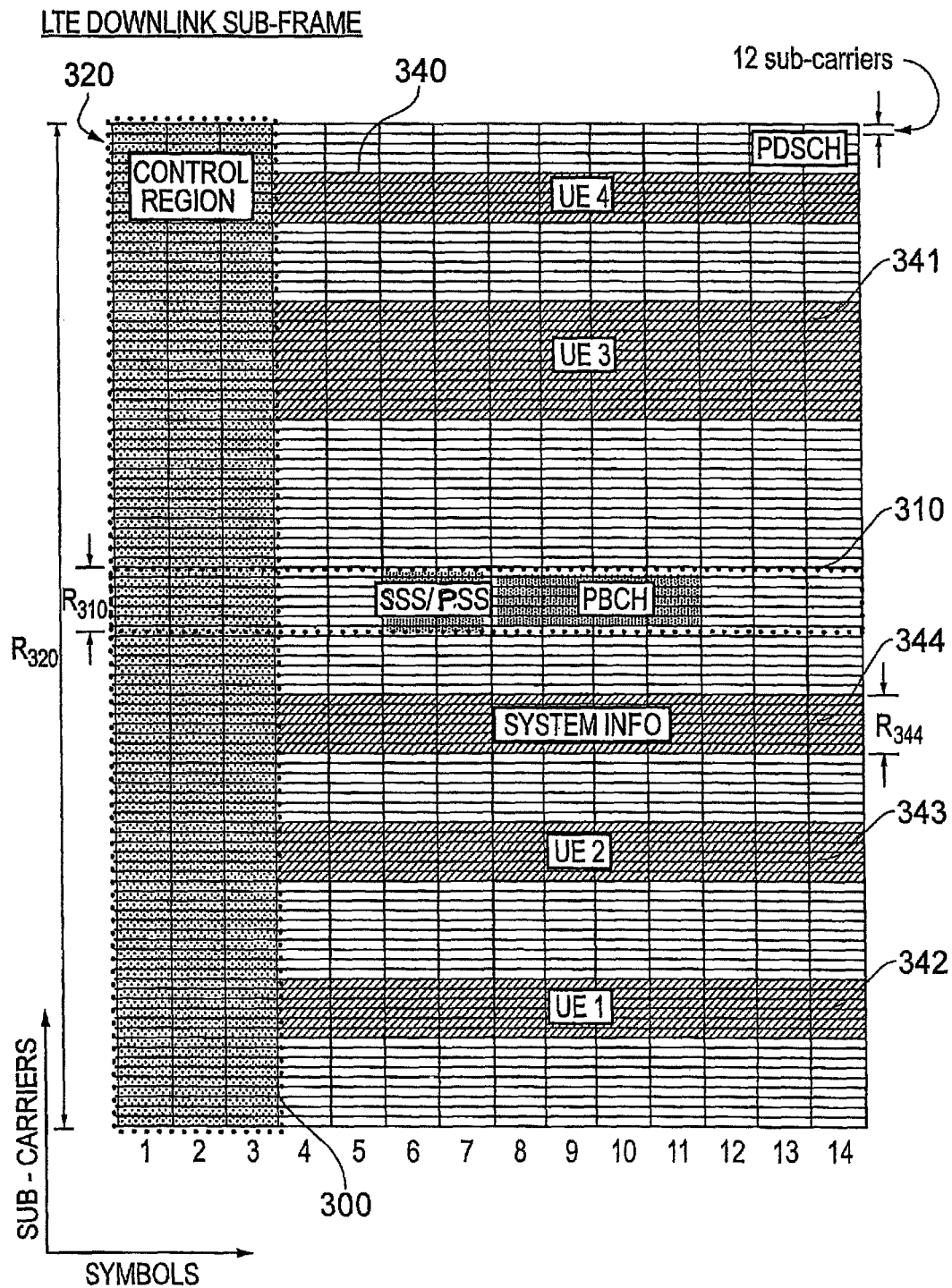
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licenced for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

The communications between the base stations 101 and the terminal devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator. Other devices may be operating using other radio resources in an unlicensed radio spectrum band, for example using Wi-Fi or Bluetooth technologies.

As noted above, it has been proposed that a wireless telecommunications network using radio resources in a licensed portion of the radio spectrum might be supported by using radio resources in an unlicensed portion of the radio spectrum (i.e. a portion of the radio spectrum over which the wireless telecommunications network does not have exclusive access, but rather which is shared by other access technologies and/or other wireless telecommunications networks). In particular, it has been proposed that carrier aggregation based techniques may be used to allow unlicensed radio resources to be used in conjunction with licensed radio resources.

In essence, carrier aggregation allows for communications between a base station and a terminal device to be made using more than one carrier. This can increase the maximum data rate that may be achieved between a base station and a terminal device as compared to when using only one carrier and can help enable more efficient and productive use of fragmented spectrum. Individual carriers that are aggregated are commonly referred to as component carriers (or sometimes simply components). In the context of LTE, carrier aggregation was introduced in Release 10 of the standard. In accordance with the current standards for carrier aggregation in an LTE-based system, up to five component carriers can be aggregated for each of downlink and uplink. The component carriers are not required to be contiguous with one another and can have a system bandwidth corresponding to any of the LTE-defined values (1.4 MHz, 3 MHz, 5 MHz, 10 MHz, 15 MHz and 20 MHz), thereby allowing a total bandwidth of up to 100 MHz. Of course it will be appreciated this is just one example of a specific carrier aggregation implementation and other implementations may allow for different numbers of component carriers and/or bandwidths.

Further information on the operation of carrier aggregation in the context of LTE-based wireless telecommunications systems can be found in the relevant standards documents, such as ETSI TS 136 211 V11.5.0 (2014-01)/3GPP TS 36.211 version 11.5.0 Release 11 [2], ETSI TS 136 212 V11.4.0 (2014-01)/3GPP TS 36.212 version 11.4.0 Release 11 [3]; ETSI TS 136 213 V11.6.0 (2014-03)/3GPP TS 36.213 version 11.6.0 Release 11 [4]; ETSI TS 136 321 V11.5.0 (2014-03)/3GPP TS 36.321 version 11.5.0 Release 11 [5]; and ETSI TS 136 331 V11.7.0 (2014-03)/3GPP TS 36.331 version 11.7.0 Release 11 [6].

In accordance with the terminology and implementation used for carrier aggregation in the context of an LTE-based system, a cell is denoted the 'primary cell', or Pcell, for a terminal device if it is the cell that is initially configured during connection setup for the terminal device. Thus the primary cell handles RRC (radio resource control) connection establishment/re-establishment for the terminal device. The primary cell is associated with a downlink component carrier and an uplink component carrier (CoC). These may sometimes be referred to herein as primary component carriers. A cell that is configured for use by the terminal device after initial connection establishment on the Pcell is termed a 'secondary cell', or Scell. Thus the secondary cells are configured after connections establishment to provide additional radio resources. The carriers associated with Scells may sometimes be referred to herein as secondary component carriers. Since in LTE up to five component carriers can be aggregated, up to four Scells (correspondingly associated with up to four secondary component carriers) can be configured for aggregation with the primary cell (associated with the primary component carrier). An Scell might not have both a downlink and uplink component carrier and the association between uplink component carriers and downlink component carriers is signalled in SIB2 on each downlink component carrier. The primary cell supports PDCCH and PDSCH on downlink and PUSCH and PUCCH on uplink whereas the secondary cell(s) support PDCCH and PDSCH on downlink and PUSCH on uplink, but not PUCCH. Measurement and mobility procedures are handled on the Pcell and the Pcell cannot be de-activated. The Scell(s) may be dynamically activated and deactivated, for example according to traffic needs, though MAC layer signalling to the terminal device. An Scells for a terminal device may also be deactivated automatically (time out) if the terminal device does not receive any transmission resource allocations on the Scell for a threshold amount of time.

Some aspects of physical layer control signalling for an LTE-based implementation of carrier aggregation based on the current standards are now described.

Each downlink component carrier has the normal LTE control channels: (E)PDCCH, PCFICH and PHICH. However, carrier aggregation introduces the possibility of so-called cross-carrier scheduling (XCS) on PDCCH. To support cross-carrier scheduling, a downlink control information (DCI) message on PDCCH includes a carrier indicator field (CIF) comprising three bits to indicate which of the component carriers the PDCCH message applies to. If there is no CIF, the PDCCH is treated as applying to the carrier on which it is received. A motivation for providing cross-carrier scheduling primarily applies for heterogeneous network (het-net) scenarios where overlaid macro- and small-cells may operate carrier aggregation in the same band. The effects of interference between the respective macro- and small-cells' PDCCH signalling can be mitigated by having the macro-cell transmit its PDCCH signalling on one component carrier at relatively high transmit power (to provide coverage across the macro-cell), while the small-cells use an alternative component carrier for their PDCCH scheduling.

The control region supporting PDCCH may differ in size (i.e. number of OFDM symbols) between component carriers, so they can carry different PCFICH values. However, the potential for interference in the control region in a het-net implementation may mean that PCFICH cannot be decoded on a particular component carrier. Therefore, current LTE standards allow for each component to carrier a semi-static indication of which OFDM symbol PDSCH can be assumed to begin in each subframe. If fewer OFDM symbols are actually used for the control region, the free/spare OFDM symbol(s) may be used for PDSCH transmissions to terminal devices which are not being cross-carrier scheduled as they will decode the actual PCFICH. If more OFDM symbols actually used for the control region, there will be some degree of performance degradation for the cross-carrier scheduled terminal devices.

PHICH signalling is sent on the downlink component carrier that sent the PDCCH signalling containing the PUSCH allocation to which the PHICH signalling relates. Accordingly, one downlink component carrier may carry PHICH for more than one component carrier.

In the uplink, the basic operation of PUCCH is not altered by the introduction of carrier aggregation. However, a new PUCCH format (format 3) is introduced to support the sending of acknowledgement signalling (ACK/NACK signalling) for multiple downlink component carriers, and with some alterations to format 1b to increase the number of ACK/NACK bits it can carry.

In current LTE-based carrier aggregation scenarios, primary and secondary synchronisation signalling (PSS and SSS) are transmitted on all component carriers using the same physical-layer cell identity (PCI) and component carriers are all synchronised with one another. This can help with cell search and discovery procedures. Issues relating to security and system information (SI) are handled by the Pcell. In particular, when activating an Scell, the Pcell delivers the relevant SI for the Scell to the terminal device using dedicated RRC signalling. If the system information relating to a Scell changes, the Scell is released and re-added by Pcell RRC signalling (in one RRC message). Pcell changes, e.g. due to long-term fluctuations in channel quality across the Pcell bandwidth, are handled using a modified handover procedure. The source Pcell passes all the relevant carrier aggregation (CA) information to the target Pcell so the terminal device can begin to use all the assigned component carriers when handover is complete.

Random access procedures are primarily handled on the uplink component carrier of Pcell for a terminal device, although some aspects of contention resolution signalling may be cross-carrier scheduled to another serving cell (i.e. an Scell).

As noted above, carrier aggregation is one approach for making use of unlicensed radio spectrum resources in wireless communication networks which are primarily designed to use licensed radio spectrum. In broad summary, a carrier aggregation based approach may be used to configure and operate a first component carrier (e.g. a primary component carrier associated with a Pcell in LTE terminology) within a region of the radio spectrum that has been licensed for use by a wireless telecommunications network, and to also configure and operate one or more further component carriers (e.g. a secondary component carrier associated with an Scell in LTE terminology) in an unlicensed region of the radio spectrum. The secondary component carrier(s) operating in the unlicensed region of the radio spectrum may do so in an opportunistic manner by making use of the unlicensed radio resources when they are available. There may also be provisions made for restricting the extent to which a given operator can make use of the unlicensed radio resources, for example by defining what might be referred to as politeness protocols.

Although known carrier aggregation schemes can form a basis for using unlicensed radio spectrum resources (or other forms of shared radio resources) in conjunction with licensed radio spectrum resources, some modifications to known carrier aggregation techniques may be appropriate to help optimise performance. This is because radio interference in the unlicensed radio spectrum can be expected to be subject to a wider range of unknown and unpredictable variations in time and frequency than might be seen within a region of the radio spectrum which has been licensed for use by a particular wireless applications system. For a given wireless telecommunications system operating in accordance with a given technology, such as LTE-A, interference in the unlicensed radio spectrum may arise from other systems operating quantity same technology, or systems operating according to different technologies, such as Wi-Fi or Bluetooth.

Figure 4:
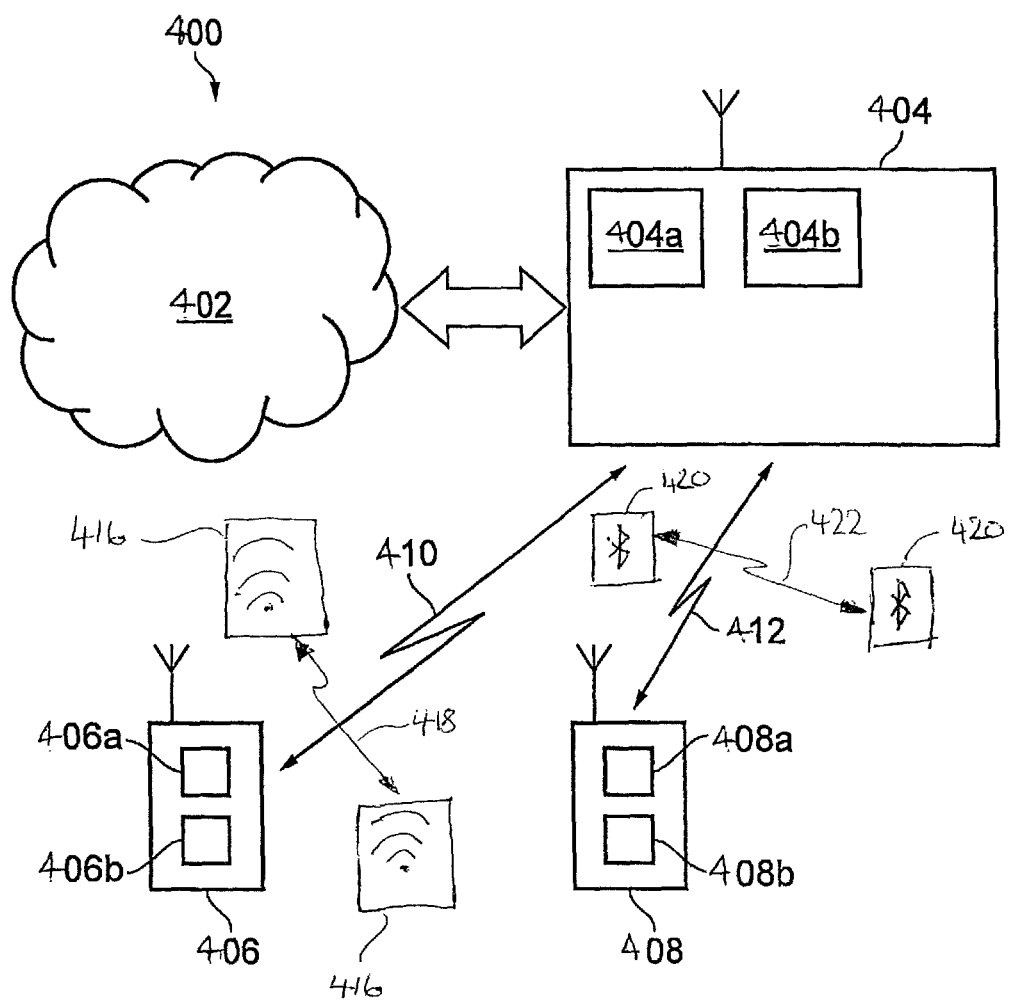
FIG. 4 schematically represents a wireless telecommunications system according to an embodiment of the disclosure.

FIG. 4 schematically shows a telecommunications system 400 according to an embodiment of the disclosure. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404, a first terminal device 406 and a second terminal device 408. It will of course be appreciated that in practice the radio network part may comprise a plurality of base stations serving a larger number of terminal devices across various communication cells. However, only a single base station and two terminal devices are shown in FIG. 4 in the interests of simplicity.

Although not part of the telecommunications system 400 itself, also shown in FIG. 4 are some other devices which are operable to wirelessly communicate with one another and which are operating within the radio environment of the telecommunications system 400. In particular, there is a pair of wireless access devices 416 communicating with one another via radio link 418 operating in accordance with a Wi-Fi standard and a pair of Bluetooth devices 420 communicating with one another via radio link 422 operating in accordance with a Bluetooth standard. These other devices represent a potential source of radio interference for the telecommunications system 400. It will be appreciated that in practice there will typically be many more such devices operating in the radio environment of the wireless telecommunications system 400, and only two pairs of devices 416, 418 are shown in FIG. 4 for simplicity.

As with a conventional mobile radio network, the terminal devices 406, 408 are arranged to wirelessly communicate data to and from the base station (transceiver station) 404. The base station is in turn communicatively connected to a serving gateway, S-GW, (not shown) in the core network part which is arranged to perform routing and management of mobile communications services to the terminal devices in the telecommunications system 400 via the base station 404. In order to maintain mobility management and connectivity, the core network part 402 also includes a mobility management entity (not shown) which manages the enhanced packet service, EPS, connections with the terminal devices 406, 408 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with embodiments of the disclosure as discussed herein.

The terminal devices 406, 408 each comprise a transceiver unit 406a, 408a for transmission and reception of wireless signals and a controller unit 406b, 408b configured to control the operation of the respective devices 406, 408 in accordance with embodiments of the disclosure. The respective controller units 406b, 408b may each comprise a processor unit which is suitably configured/programmed to provide the desired functionality described herein using conventional programming/configuration techniques for equipment in wireless telecommunications systems. For each of the terminal devices 406, 408, their respective transceiver units 406a, 408a and controller units 406b, 408b are schematically shown in FIG. 4 as separate elements for ease of representation. However, it will be appreciated that for each terminal device the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminal devices 406, 408 will in general comprise various other elements associated with their operating functionality in accordance with established wireless telecommunications techniques (e.g. a power source, possibly a user interface, and so forth).

As has become commonplace in the field of wireless telecommunications, terminal devices may support Wi-Fi and Bluetooth functionality in addition to cellular/mobile telecommunications functionality. Thus the transceiver units 406a, 408a of the respective terminal devices may comprise functional modules operable according to different wireless communications operating standards. For example, the terminal devices' transceiver units may each comprise an LTE transceiver module for supporting wireless communications in accordance with an LTE-based operating standard, a WLAN transceiver module for supporting wireless communications in accordance with a WLAN operating standard (e.g. a Wi-Fi standard), and a Bluetooth transceiver module for supporting wireless communications in accordance with a Bluetooth operating standard. The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver units 406a, 408a of the terminal devices 406, 408 represented in FIG. 4 are assumed here to provide the functionality of an LTE transceiver module, a Wi-Fi transceiver module and a Bluetooth transceiver module in accordance with conventional wireless communications techniques.

The base station 404 comprises a transceiver unit 404a for transmission and reception of wireless signals and a controller unit 404b configured to control the base station 404. The controller unit 404b may comprise a processor unit which is suitably configured/programmed to provide the desired functionality described herein using conventional programming/configuration techniques for equipment in wireless telecommunications systems. The transceiver unit 404a and the controller unit 404b are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 404b.

Thus, the base station 404 is configured to communicate data with the first and second terminal devices 406, 408 over respective first and second radio communication links 410, 412. The wireless telecommunications system 400 supports a carrier aggregation mode of operation in which the first and second radio communication links 410, 412 each comprise a wireless access interface provided by multiple component carriers. For example, each radio communication link may comprise a primary component carrier and one or more secondary component carriers. Furthermore, the elements comprising the wireless telecommunications system 400 in accordance with this embodiment of the disclosure are assumed to support carrier aggregation in an unlicensed spectrum mode. In this unlicensed spectrum mode the base station communicates with terminal devices using a primary component carrier operating on radio resources within a first frequency band that has been licensed for use by the wireless telecommunications system and one or more secondary component carriers operating on radio resources within a second frequency band that has not been licensed for exclusive use by the wireless telecommunications system. The first frequency band may sometimes be referred to herein as a licensed frequency band and the second frequency band may sometimes be referred to herein as an unlicensed (U) frequency band. In the context of an LTE-based wireless telecommunications system, such as that represented in FIG. 4, operation in the unlicensed frequency band may be referred to as an LTE-U mode of operation. The first (licenced) frequency band may be referred to as an LTE band (or more particularly an LTE-A band) and the second (unlicensed) frequency band may be referred to as an LTE-U band. Resources on the LTE-U band may be referred to as U-resources. A terminal device able to make use of U-resources may be referred to as a U-terminal device (or U-UE). More generally, the qualifier "U" may be used herein to conveniently identify operations in respect of the unlicensed frequency band.

It will be appreciated that the use of carrier aggregation techniques and the use of unlicensed spectrum resources (i.e. resources that may be used by other devices without centralised coordination) in accordance with embodiments of the disclosure may be based generally on previously proposed principles for such modes of operation, for example as discussed above, but with modifications as described herein to provide additional functionality in accordance with embodiments of the present disclosure. Accordingly, aspects of the carrier aggregation and unlicensed spectrum operation which are not described in detail herein may be implemented in accordance with known techniques.

Modes of operation for the wireless telecommunications network 400 represented in FIG. 4 in accordance with certain embodiments of the disclosure will now be described. The general scenario for these embodiments is assumed to be one in which a carrier aggregation capable terminal device is operating in an LTE-A cell as normal, and the base station determines that it should configure the LTE-U capable terminal device with an additional aggregated carrier using LTE-U resources. The specific reason why the base station determines that it should configure a particular terminal device for LTE-U based carrier aggregation is not significant. Thus the LTE-A carrier provides a Pcell for the terminal device and the LTE-U resources provide one or more Scell(s) for the terminal device. It will be appreciated the LTE-A resources may also be used to provide component carriers associated with one or more further Scells(s) in accordance with conventional carrier aggregation techniques. For the examples described with reference to FIG. 4, the LTE-A transmissions in the licenced frequency band and the LTE-U transmissions in the unlicensed frequency band, and thus the Pcell and Scell(s), are both made from the same base station 404, but this may not be the case in other example embodiments. The LTE-U carrier could in general be utilised with a TDD (time division duplex) or FDD (frequency division duplex) frame structure. However, a consequence of some aspects of existing regulatory restrictions on unlicensed spectrum usage in some regions means that TDD or downlink-only FDD operation may, at least currently, be more likely.

Figure 5:
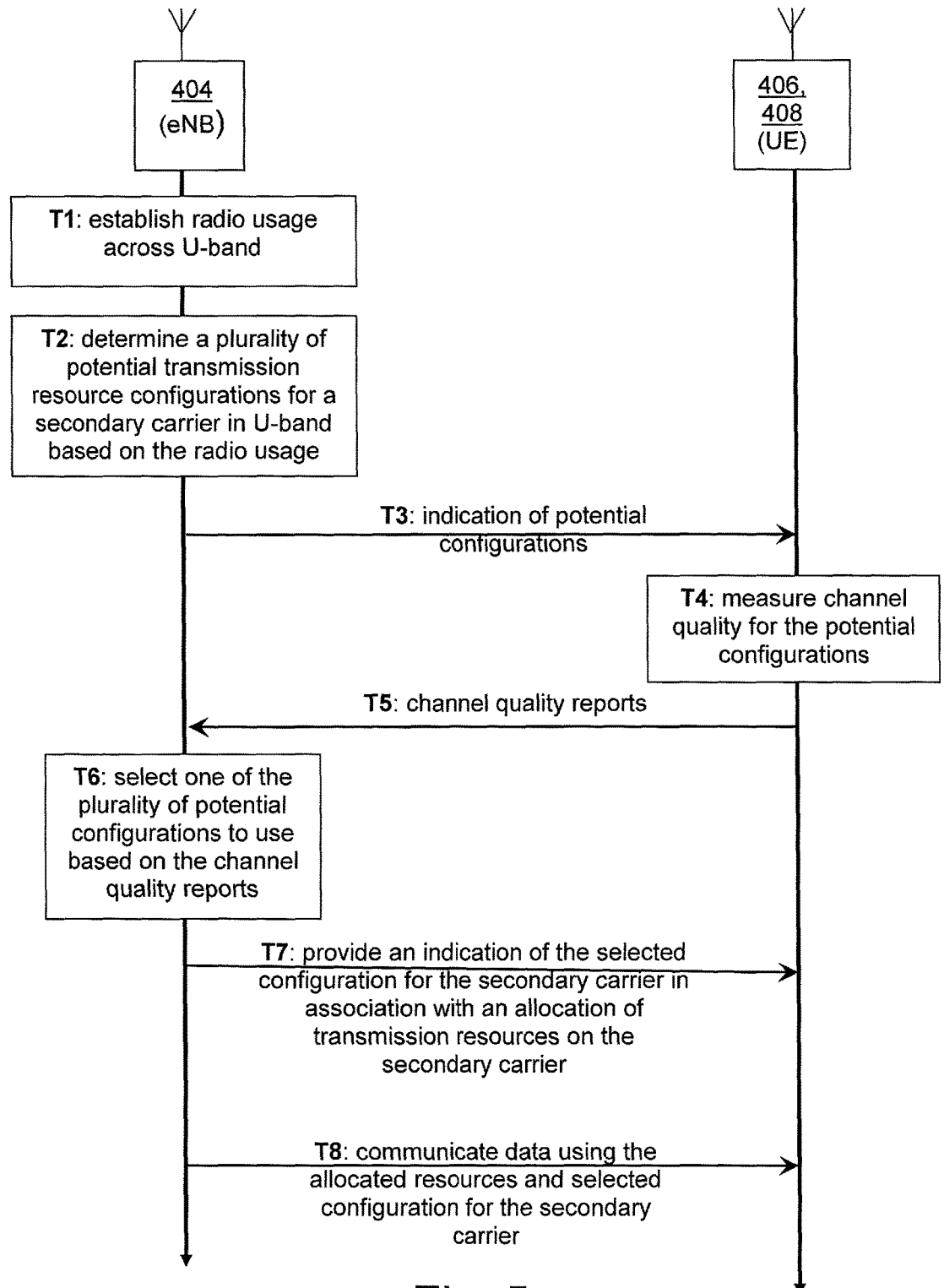
FIG. 5 is a signalling ladder diagrams representing communications between a base station and a terminal device operating in accordance with some embodiments of the disclosure.

FIG. 5 is a signalling ladder diagram schematically representing modes of operation for one of the terminal devices (UEs) 406, 408 and the base station (eNB) 404 schematically represented in FIG. 4 in accordance with certain embodiments of the present disclosure. The operation is for communicating using a primary component carrier (associated with a primary cell) operating on radio resources within a first frequency band and a secondary component carrier (associated with a secondary cell) operating on radio resources within a second frequency band in accordance with certain embodiments of the present disclosure. As discussed above, the first frequency band is taken to correspond with resources that have been licensed for dedicated use by the operator of the wireless telecommunications system 400 whereas the second frequency band is taken to correspond with resources that are shared by other wireless communication technologies, and in particular in this example by Wi-Fi. In broad summary, some embodiments of the disclosure introduce the concept of establishing a plurality of transmission resource configurations (e.g. frequencies) that might potentially be used for a secondary carrier in the context of carrier aggregation using radio resources that are shared between different network operators and/or different wireless access technologies, and indicating to a terminal device which configuration is to be used in association with an allocation of transmission resources on the secondary carrier.

Some aspects of the operation represented in FIG. 5 are performed in a generally iterative manner as discussed further below. Processing in accordance with certain embodiments of the disclosure as schematically represented in FIG. 5 is shown starting from a stage at which the terminal device is configured for operation on the primary cell associated with the primary carrier, but is not yet configured for operation on the secondary cell associated with the secondary carrier. This may be, for example, because the terminal device has only just connected to the primary cell or because a previous secondary cell configuration is no longer valid.

In step T1 the base station establishes a measure of radio usage in the second frequency band. In some example implementations the base station may itself measure radio usage at different frequencies across the second frequency band, but in this example it is assumed the terminal device makes these measurements and reports them to the base station. That is to say, in this example implementation the base station establishes radio usage across the second band (unlicensed band) from reports received from the terminal device (and/or other terminal devices operating in the wireless telecommunications system).

Thus, the terminal device makes measurement of radio usage in the second frequency band in its environment. In particular, the terminal device measures the degree of radio usage at different frequencies across the second frequency band. For example, the terminal device may use its WLAN transceiver module to scan for activity associated with other wireless communication devices, for example, Wi-Fi access points. From this the terminal device may establish, for example, an indication of frequency resources used by other wireless communications devices and/or an indication of a received signal strength for wireless communications associated with other wireless communications devices and/or an indication of an identifier for the other wireless communications device (e.g. SSID). The terminal device may also scan for radio usage in the second frequency band by other devices operating according to other operating standards, for example Bluetooth and/or other LTE networks. In some embodiments the terminal device might not separately measure radio usage by different technologies, but may simply measure an aggregate level of radio signals (which may include radio noise) in its environment at different frequencies across the second frequency band. The terminal device then transmits an indication of the measurements of radio usage at different frequencies across the second frequency band to the base station. This may be done on uplink radio resources on the already-configured primary cell to which the terminal device is connected in accordance with conventional signalling techniques, for example in accordance with the established principles of measurement report RRC signalling. Based on the measurement information regarding radio usage in the second frequency band received from the terminal device, the base station establishes radio usage across the secondary band in step T1 represented in FIG. 5.

In step T2 the base station determines a plurality of potential transmission resource configurations, e.g. a plurality of potential carrier frequencies and bandwidth, for a secondary component carrier operating in the second frequency band. This determination is based on the radio usage established in step T1. For example, the base station may be configured to determine four (or another number) of possible frequency configurations (e.g. in terms of centre frequency and/or bandwidth) for a secondary component carrier operating within the second frequency band. These may be selected to correspond with regions of the second frequency band determined to have the lowest amount of radio usage according to usage established in step T1. For example, if the second frequency band supports Wi-Fi and Bluetooth communications by other wireless communication devices operating in the radio environment of the terminal device, the base station may identify regions of the second frequency band which are expected to suffer least from interference from such communications. For example, regions of the second frequency band spectrum where the measurements of radio usage established in step T1 indicate there is relatively little radio traffic that would interfere with LTE-based communications between the base station and the terminal device. More generally, the base station may determine appropriate transmission resources (e.g. in terms of time and/or frequency resources) from within the second frequency band to define a plurality of potential configuration settings for a secondary component carrier based on the radio usage determined in step T1 using established techniques for selecting appropriate transmission resources in a competitive (opportunistic) radio environment when taking account of measurements of existing usage. For example, the base station may avoid transmission resources in regions of the second frequency band for which the terminal device measurement reports indicate a relatively high degree of radio usage, and may instead preferentially select configurations for the secondary carrier that make use of transmission resources in spectral regions having a relatively low degree of radio usage. In this particular example it is assumed the base station is configured to select four potential configurations for a secondary carrier corresponding to the configurations identified as having the lowest expectation of interference. In some cases account may also be taken of throughput. For example, a larger bandwidth that encompasses sub-regions of the second frequency band having relatively high radio usage may nonetheless be selected over a smaller bandwidth that avoids the sub-regions associated with relatively high radio usage to avoid restricting transmissions on the secondary carrier to a relatively narrow bandwidths. In some cases the base station may also take into account its own load, for example some carriers may already have been assigned to other devices to operate using LTU-U.

For this particular example it is assumed step T2 results in the determination of four possible configuration settings, for example in terms of carrier frequencies and/or carrier bandwidths, which might subsequently be used for secondary carrier operation. The different secondary carrier configuration settings may be contiguous or non-contiguous across the second frequency band and may have the same or different bandwidths. For example, the base station may determine the following four potential configuration settings: Configuration 1=a bandwidth of 5 MHz centred on a frequency of $F_1$; Configuration 2=a bandwidth of 10 MHz centred on a frequency of $F_2$; Configuration 3=a bandwidth of 10 MHz centred on a frequency of $F_3$, Configuration 4=a bandwidth of 20 MHz centred on a frequency of $F_4$, where $F_4=F_3+15$ MHz such that Configuration 3 and 4 relate to contiguous frequency resources. However, it will be appreciated this is simply one particular example of what might be determined to be an appropriate group of potential configuration settings for a secondary carrier. In particular, in accordance with other implementations, there may be more or fewer potential configuration settings determined in step T2, and furthermore these configuration settings may be subject to restrictions according to the implementation at hand. For example, if a particular implementation allows only a discrete number of bandwidths and/or frequencies for a secondary component carrier (e.g. according to a relevant operating standard for the wireless telecommunications system), this will correspondingly restrict the potential carrier configurations that might be determined in step T2.

Thus, a significant difference of the approach represented in FIG. 5 as compared to previously proposed techniques for applying carrier aggregation in unlicensed spectrum is the determination of a plurality of potential configuration settings for a secondary component carrier operating in the unlicensed spectrum, as opposed to determining a single configuration setting to be used for the secondary component carrier operating in the unlicensed spectrum. That is to say, instead of determining just the most appropriate (i.e. "best" configuration setting), the top four configuration settings may be determined instead, for example. In this regard it will be appreciated there are various different ways of characterising the optimum/"best" configuration settings according to the implementation at hand. For example, selecting configurations having relatively high bandwidth may be considered more important in some situations that in some others. Likewise, selecting configurations having relatively low expected interference from existing radio usage may be considered more important in some situations than in some others. Overall, the specific manner in which specific configurations may be determined as potential configurations for the secondary carrier is not of primary significance to the principles underlying embodiments of the disclosure.

In step T3 the base station provides the terminal device with an indication of the potential configuration settings. This may be done on downlink radio resources on the already-configured primary cell in accordance with conventional signalling techniques, for example in accordance with the established principles of radio bearer (re)configuration message RRC signalling. However, whereas in accordance with existing techniques the information would indicate the configuration of a single component carrier, the information transmitted in step T3 represents a plurality of potential transmission resource configuration settings as established in step T2.

In step T4 the terminal device begins measuring channel quality for the secondary carrier configured according to the different potential configurations. The measurements of channel quality for the secondary carrier may be based on established channel quality measurement techniques in wireless telecommunications systems. In particular, the measurements undertaken in step T4 may correspond with those undertaken for conventional channel quality indicator (CQI) reporting in LTE wireless communication systems. The terminal device may sequentially configure its transceiver in accordance with the different potential configuration settings received in step T3 and undertake channel quality measurement for each secondary carrier configuration in turn based on conventional CQI reporting techniques.

In step T5 the terminal device communicates an indication of the channel quality measurements to the base station.

Again, this may be done in accordance with generally conventional CQI reporting techniques, except it is performed for each of the potential secondary carrier configurations.

It will be appreciated steps T4 and T5 are shown as separate steps in FIG. 5 for ease of representation. In practice it may be expected that steps T4 and T5 will be performed iteratively for each configuration setting in turn as the terminal device hops through the potential configuration settings. That is to say, the terminal device may configure its transceiver in accordance with the first one of the potential configuration settings, and then measure and report channel conditions for this configuration setting, and then reconfigure its transceiver in accordance with a second one of the potential configuration settings, and then measure and report channel conditions for this configuration setting, and so forth until channel quality reports have been provided to the base station for a secondary carrier operating in accordance with each of the potential configuration settings. However, in another example implementation, and depending on the terminal device's transceiver capabilities, the channel quality measurement and reporting may be performed in parallel for multiple configuration settings.

Step T6 is performed when the base station is ready to schedule the transmission of some data to the terminal device on the secondary carrier. The nature of the data, and the reason why it needs to be transmitted, is not significant. Based on the channel quality reports received in step T5, the base station selects one of the plurality of potential configuration settings for a secondary carrier to use for transmitting the data to the terminal device. In this regard the base station may, for example, choose the configuration setting which is associated with the best channel conditions, as reported in step T5. In addition to selecting what is considered to be the most appropriate configuration setting for the secondary component carrier based on the channel quality reports, the base station also selects resources within the secondary channel to use for communicating the data to the terminal device. These may be selected in accordance with generally conventional scheduling techniques in wireless telecommunications systems, for example against taking account of the channel quality reports for the relevant carrier configuration.

In step T7 the base station transmits a resource allocation message to the terminal device indicating the resources within the secondary carrier that are scheduled (allocated/granted) for use by the terminal device. The resource allocation message regarding the allocation of resources within the secondary carrier may be based on conventional techniques, for example in an LTE context the message of step T7 may be provided as downlink control information (DCI) signalling on (E)PDCCH in order to indicate transmission resources on PDSCH according to generally conventional techniques. Furthermore, the resource allocation message relating to the secondary carrier may be communicated on the primary carrier in accordance with established cross-carrier scheduling techniques in carrier aggregation scenarios. However, in accordance with embodiments of the present disclosure, the resource allocation message indicating the allocation of resources within the secondary carrier is additionally associated with an indication of the configuration setting selected by the base station in step T6 for configuring the secondary carrier for transmitting the data to which the resource allocation message relates.

There are various ways in which the indication of the selected configuration setting for the secondary carrier may be communicated to the terminal device in association with the resource allocation message. In this particular example it is assumed the indication of the selected configuration setting for the secondary carrier to be used for conveying the data on the resources indicated in the resource allocation message is provided within the resource allocation message itself. This may be achieved, for example, by establishing a new format for downlink control information which includes an indication of the selected one of the plurality of potential carrier configurations. For example, in an implementation in which there are four potential configuration settings established for the secondary carrier, the downlink control information associated with the resource allocation message may include a two-bit indication as an index to which of the four potential configuration settings is to be used. Other indications of the selected configuration included in the downlink control information may include, for example, a pointer to an entry in a table of potential configuration settings established according to an operating standard for the wireless telecommunications system, or a reference to a specific EARFCN (E-Absolute Radio Frequency Channel Number). In another example implementation, a separate message may be defined for conveying the indication of the selected configuration setting to be used. Furthermore, the selected configuration setting may apply for only a single subframe (i.e. for one resource allocation message) or may apply for a plurality of subframes (i.e. for a plurality of resource allocation messages). For example, the base station may convey the indication of the selected one of the potential carrier configurations once every frame and it may then be assumed to apply for each subframe in the frame. In another implementation the base station may only convey an indication of a selected one of the potential carrier configurations when it is changed. Thus the terminal device may be configured to assume a currently selected carrier configuration remains valid until it receives an indication that a new configuration settings for the secondary carrier has been selected for use by the base station.

In step T8 represented in FIG. 5, the base station proceeds to communicate data to the terminal device on a secondary component carrier configured in accordance with the selected configuration setting, and using transmission resources within the secondary component carrier as identified by the resource allocation message. The terminal device is able to configure its transceiver in accordance with the selected configuration setting for the secondary carrier and decode the relevant transmission resources to receive the data.

For implementations in which the indication of the selected carrier configuration is provided in the same subframe (time block) as the data to which the resource allocation message relates (for example within a control region of the subframe, e.g. within the (E)PDCCH resource allocation message itself in an LTE-based implementation), the terminal devices may receive and buffer radio signals on transmission resources associated with all the potential carrier configurations so the appropriate transmission resources can be decoded once the selected configuration setting is established by the terminal device from the signalling received from the base station. In other implementations in which the indication of the selected carrier configuration is provided in advance of the subframe containing the data to which the resource allocation message relates, the terminal device may configure its transceiver for receiving the secondary carrier in accordance with the selected configuration settings to allow the allocated resources to be decoded.

After the data is communicated in step T8, the processing may return to step T4 and continue from there in an iterative manner.

Thus to summarise some aspects of the above-described embodiments of the disclosure, a wireless telecommunications system is provided in which a plurality of potential configuration settings for a secondary carrier operating in an unlicensed band are established and known to both the terminal device and the base station. The terminal device measures channel conditions associated with each of the potential configurations for the secondary component carrier, and reports these to the base station. Based on this the base station selects an appropriate one of the plurality of potential configurations to use for travelling data to the terminal device. The base station may then transmit a resource allocation message to the terminal device relating to the data transmissions to be made on the secondary component carrier. Significantly, the base station also provides the terminal device with an indication of the secondary component carrier configuration setting to be used for receiving the data associated with the resource allocation message. In accordance with certain embodiments of the disclosure the indication of the selected configuration setting for the second component carrier (e.g. the time and/or frequency resources to be used for the second component carrier) is conveyed from the base station using layer 1 signalling/physical layer signalling. This allows for faster switching between different carrier configuration settings than would be the case with conventional RRC reconfiguration signalling. This allows the base station to react relatively quickly to fluctuations in interference from other radio access technologies operating within the second frequency band. In particular, this can be done on a per subframe/time block basis if desired. This would not be possible with previous techniques in which a reconfiguration of settings for a secondary component carrier is established through RRC signalling. As well as being beneficial for the general operation of the wireless telecommunications system itself, the ability to rapidly switch configuration settings for the secondary carrier may also help reduce the extent to which communications between the base station and the terminal device interfere with other devices trying to access the shared resources of the second frequency band. What is more, frequent changes in configuration setting for a secondary component carrier can be made in accordance with embodiments of the disclosure, for example in response to frequent changes in channel conditions within the second frequency band, with less signalling overhead than with existing techniques.

As described above, in accordance with certain embodiments of the invention, a plurality of potential transmission resources configurations may be determined from a scan of radio usage within the second frequency band by the terminal device, for example using a WLAN transceiver module and/or a Bluetooth transceiver module. Once the terminal device has performed this initial scan, the resulting potential carrier configuration settings may be maintained for an extended period, for example until the base station determines from the channel quality reports received from the terminal device that none of the potential configuration settings are able to provide a desired level of performance. This can result in a saving in terminal device battery power since it does not need to measure and report on radio usage in the second frequency band each time a configuration setting for the second component carrier is to be changed. In the event the base station determines from the channel quality reports received from the terminal device that none of the current plurality of potential configuration settings are able to provide an acceptable degree of performance, the base station may in effect return to step T1 of the processing represented in FIG. 5 to begin the process of establishing a new plurality of potential carrier configurations for the secondary component carrier. This may involve the base station sending a request message to the terminal device to trigger the terminal device to measure and report on radio usage across the second frequency band. This request may, for example, be made in accordance with conventional control signalling techniques on the primary carrier.

It will be appreciated the processing represented in FIG. 5 may be modified for operation in accordance with other embodiments of the disclosure. For example, whereas steps T4 and T5 as described above may be performed by the terminal device cycling through the different potential transmission resources configurations, in accordance with some embodiments a terminal device might only make channel quality reports in respect of a currently-selected configuration (i.e. in respect of the configuration indicated in step T7) in the processing of FIG. 5 in accordance with conventional LTE procedures. In this case, the base station may then request the terminal device to make measurements in respect of the other potential configurations. That is to say, the base station may send a request message to the terminal device, for example using conventional request signalling techniques, to indicate the terminal device should measure channel quality for one or more other potential configurations, and provide the basis with a corresponding one or more channel quality report. That is to say, the base station may be configured to control the manner in which the terminal device is performing and we supporting channel quality/channel state measurements.

It will be appreciated that while the above-described embodiments are focused on a single base station supporting both the primary component carrier the secondary component carrier, more generally these could be transmitted from separate base stations. In this regard, the network-side processing in accordance with embodiments of the present disclosure may be performed by network infrastructure equipment which comprises, for example, one base station or more than one base station, and potentially other network infrastructure equipment elements according to the operating principles of the wireless telecommunications network in which the approach is implemented.

It will be appreciated the principles described above may be applied in respect of a wireless telecommunications system supporting carrier aggregation with secondary component carriers operating in a frequency band over which the wireless telecommunications system does not have exclusive control irrespective of whether or not the wireless telecommunications system requires an administrative license to operate in the secondary frequency band. That is to say, it will be appreciated the terminology "unlicensed" is used herein for convenience to refer to operation in a band over which the wireless telecommunications system does not have exclusive access. In many implementations this will correspond with a licence exempt frequency band. However, in other implementations the operation may be applied in a frequency band which is not unlicensed in the strict administrative sense, but which is nonetheless available for shared/opportunistic use by devices operating according to different wireless access technologies (e.g. LTE-based, Wi-Fi-based and/or Bluetooth-based technologies) and/or multiple networks operating according to the same technology (e.g. LTE-based wireless communication systems provided by different network operators). In this regard the terminology such as "unlicensed frequency band" may be considered to refer generally to a frequency band in which resources are shared by different wireless communications systems. Accordingly, while the term "unlicensed" is commonly used to refer to these types of frequency bands, in some deployment scenarios an operator of a wireless telecommunications system may nonetheless be required to hold an administrative license to operate in these frequency bands.

Thus there has been described a method of operating a terminal device and network infrastructure equipment in a wireless telecommunications system for communicating on a primary cell supporting a primary component carrier on radio resources within a first frequency band and a secondary cell supporting a secondary component carrier on radio resources within a second frequency band. The infrastructure equipment establishes a plurality of configuration settings for the secondary carrier (e.g. in terms of frequency and/or time resources) based on measurements of radio usage in the second frequency band. The configuration settings (which may in some respects be viewed as semi-static secondary cell pre-configurations) are conveyed to the terminal device. The terminal device makes channel quality measurements for the secondary component carrier according to the different configuration settings and reports these to the infrastructure equipment. Based on these measurements of channel quality for the different configurations of the secondary carrier, the infrastructure equipment selects one of the configuration settings, and conveys an indication of this to the terminal device in association with an allocation of transmission resources on the secondary component carrier. Data is then transmitted from the infrastructure equipment to the terminal device using the allocated resources on the secondary component carrier with the secondary component carrier operating in accordance with the selected configuration.

Thus, communications between the terminal device and the network infrastructure may be made using a primary cell associated with a primary component carrier configuration and a secondary cell associated with a plurality of potential secondary component carrier configurations (e.g. frequency characteristics). Transmissions of data from the network infrastructure to the terminal device may then be associated with an indication of which of the potential/candidate secondary component carriers are to be used for the data. The indication of the secondary carrier may be conveyed using physical layer/layer 1 signalling, for example on the primary cell. In particular, the indication of the secondary carrier may be associated with a control message indicating an allocation of transmission resources on the secondary carrier for associated data. The network infrastructure element responsible for selecting the secondary component carrier from the plurality of potential secondary carriers may do so based on channel condition measurements, for example, using channel quality indicator (CQI) reports received from the terminal device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof.

Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device in a wireless telecommunications system for communicating with network infrastructure equipment on a primary cell supporting a primary component carrier on radio resources within a first frequency band and a secondary cell supporting a secondary component carrier on radio resources within a second frequency band, wherein the method comprises: receiving from the network infrastructure equipment an indication of a plurality of potential configuration settings for the secondary component carrier; receiving from the network infrastructure equipment an allocation message indicating an allocation of transmission resources to be used for communicating data between the network infrastructure equipment and the terminal device on the secondary component carrier; receiving from the network infrastructure equipment in association with the allocation message an indication of a selected one of the plurality of potential configuration settings for the secondary component carrier to be used for communicating the data; and receiving the data from the network infrastructure equipment using the allocated resources on the secondary component carrier operating in accordance with the selected one of the plurality of potential configuration settings.

Paragraph 2. The method of paragraph 1, further comprising: receiving from the network infrastructure equipment a further allocation message indicating a further allocation of transmission resources to be used for communicating further data between the network infrastructure equipment and the terminal device on the secondary component carrier; receiving from the network infrastructure equipment in association with the further allocation message a further indication of another selected one of the plurality of potential configuration settings for the secondary component carrier to be used for communicating the further data; and receiving the further data from the network infrastructure equipment using the further allocated resources on the secondary component carrier operating in accordance with the other selected one of the plurality of potential configuration settings.

Paragraph 3. The method of paragraph 1 or 2, wherein the allocation message includes the indication of the selected one of the plurality of potential configuration settings for the secondary component carrier to be used for communicating the data.

Paragraph 4. The method of any one of paragraphs 1 to 3, wherein the indication of the selected one of the plurality of potential configuration settings for the secondary component carrier is specific to the associated allocation message.

Paragraph 5. The method of any one of paragraphs 1 to 4, wherein the indication of the selected one of the plurality of potential configuration settings is associated with a plurality of allocation messages indicating allocations of transmission resources to be used for communicating data between the network infrastructure equipment and the terminal device on the secondary component carrier.

Paragraph 6. The method of any one of paragraphs 1 to 5, wherein the indication of the selected one of the plurality of potential configuration settings is received by the terminal device from the network infrastructure equipment using layer 1 signalling.

Paragraph 7. The method of any one of paragraphs 1 to 6, wherein communications between the network infrastructure equipment and the terminal device are made with a radio frame structure comprising a plurality of time blocks, and wherein the selected one of the plurality of potential configuration settings for the secondary component carrier is valid for one time block or more time blocks.

Paragraph 8. The method of paragraph 7, wherein the indication of the selected one of the plurality of potential configuration settings is received in the same time block as the allocation message with which it is associated.

Paragraph 9. The method of paragraph 7, wherein the indication of the selected one of the plurality of potential configuration settings is received in a time block that is before a time block containing the allocation message with which it is associated.

Paragraph 10. The method of any one of paragraphs 1 to 9, wherein the allocation message and the indication of a selected one of the plurality of potential configuration settings for the secondary component carrier are received using transmission resources in the first frequency band.

Paragraph 11. The method of any one of paragraphs 1 to 10, wherein the indication of a plurality of potential configuration settings for the secondary component carrier are received using transmission resources in the first frequency band.

Paragraph 12. The method of any one of paragraphs 1 to 11, wherein the indication of a plurality of potential configuration settings for the secondary component carrier are received using radio resource control, RRC, signalling.

Paragraph 13. The method of any one of paragraphs 1 to 12, further comprising: performing channel quality measurements for different configurations of the secondary component carrier corresponding with the potential configuration settings for the secondary component carrier; and conveying an indication of the channel quality measurements to the network infrastructure equipment.

Paragraph 14. The method of any one of paragraphs 1 to 13, wherein the second frequency band comprises radio resources which are shared with wireless communication devices that are not part of the wireless telecommunications system.

Paragraph 15. The method of any one of paragraphs 1 to 14, further comprising making measurements of radio usage in the second frequency band and transmitting an indication of the measurements of radio usage in the second frequency band to the network infrastructure equipment prior to receiving from the network infrastructure equipment the indication of a plurality of potential configuration settings for the secondary component carrier.

Paragraph 16. The method of paragraph 15, wherein the indication of the measurements of radio usage in the second frequency band are transmitted to the network infrastructure equipment using transmission resources in the first frequency band.

Paragraph 17. The method of paragraph 15 or 16, wherein communications from the network infrastructure equipment are received by the terminal device with a receiver operating in accordance with a first wireless communications operating standard and the measurements of radio usage in the second frequency band are made with a receiver operating in accordance with a second wireless communications operating standard that is different from the first wireless communications operating standard.

Paragraph 18. The method of paragraph 17, wherein the first wireless communications operating standard is a cellular telecommunications operating standard and the second wireless communications operating standard is a non-cellular telecommunications operating standard.

Paragraph 19. The method of any one of paragraphs 15 to 18, wherein the indication of the measurements of radio usage in the second frequency band are transmitted to the network infrastructure equipment using radio resource control, RRC, signalling.

Paragraph 20. The method of any one of paragraphs 1 to 19, wherein the potential configuration settings for the secondary component carrier comprises indications of potential frequency and/or time resources to be used for the secondary component carrier.

Paragraph 21. A terminal device for use in a wireless telecommunications system for communicating with network infrastructure equipment on a primary cell supporting a primary component carrier on radio resources within a first frequency band and a secondary cell supporting a secondary component carrier on radio resources within a second frequency band, wherein the terminal device comprises a controller unit and a transceiver unit configured to operate together to: receive from the network infrastructure equipment an indication of a plurality of potential configuration settings for the secondary component carrier; receive from the network infrastructure equipment an allocation message indicating an allocation of transmission resources to be used for communicating data between the network infrastructure equipment and the terminal device on the secondary component carrier; receive from the network infrastructure equipment in association with the allocation message an indication of a selected one of the plurality of potential configuration settings for the secondary component carrier to be used for communicating the data; and receive the data from the network infrastructure equipment using the allocated resources on the secondary component carrier operating in accordance with the selected one of the plurality of potential configuration settings.

Paragraph 22. Circuitry for a terminal device for use in a wireless telecommunications system for communicating with network infrastructure equipment on a primary cell supporting a primary component carrier on radio resources within a first frequency band and a secondary cell supporting a secondary component carrier on radio resources within a second frequency band, wherein the circuitry comprises a controller element and a transceiver element configured to operate together to: receive from the network infrastructure equipment an indication of a plurality of potential configuration settings for the secondary component carrier; receive from the network infrastructure equipment an allocation message indicating an allocation of transmission resources to be used for communicating data between the network infrastructure equipment and the terminal device on the secondary component carrier; receive from the network infrastructure equipment in association with the allocation message an indication of a selected one of the plurality of potential configuration settings for the secondary component carrier to be used for communicating the data; and receive the data from the network infrastructure equipment using the allocated resources on the secondary component carrier operating in accordance with the selected one of the plurality of potential configuration settings.

Paragraph 23. A method of operating network infrastructure equipment in a wireless telecommunications system for communicating with a terminal device on a primary cell supporting a primary component carrier on radio resources within a first frequency band and a secondary cell supporting a secondary component carrier on radio resources within a second frequency band, wherein the method comprises: transmitting to the terminal device an indication of a plurality of potential configuration settings for the secondary component carrier; transmitting to the terminal device an allocation message indicating an allocation of transmission resources to be used by for communicating data to the terminal device on the secondary component carrier; transmitting to the terminal device in association with the allocation message an indication of a selected one of the plurality of potential configuration settings for the secondary component carrier to be used for communicating the data; and transmitting the data to the terminal device using the allocated resources on the secondary component carrier operating in accordance with the selected one of the plurality of potential configuration settings.

Paragraph 24. The method of paragraph 23, further comprising obtaining an indication of radio usage in the second frequency band and establishing the plurality of potential configuration settings for the secondary component carrier based on the indication of radio usage in the second frequency band.

Paragraph 25. The method of paragraph 24, wherein the indication of radio usage in the second frequency band is obtained from measurements of radio usage in the second frequency band made by the network infrastructure equipment and/or measurements of radio usage in the second frequency band made by the terminal device and reported to network infrastructure equipment and/or measurements of radio usage in the second frequency band made by other terminal devices operating in the wireless telecommunications system and reported to network infrastructure equipment.

Paragraph 26. The method of any one of paragraphs 23 to 25, further comprising receiving from the terminal device an indication of measurements of channel quality made by the terminal device for different configurations of the secondary component carrier corresponding with the potential configuration settings for the secondary component carrier, and determining the selected one of the plurality of potential configuration settings for the secondary component carrier to be used for communicating the data based on the indication of measurements of channel quality for the different configurations of the secondary component carrier.

Paragraph 27. Network infrastructure equipment for use in a wireless telecommunications system for communicating with a terminal device on a primary cell supporting a primary component carrier on radio resources within a first frequency band and a secondary cell supporting a secondary component carrier on radio resources within a second frequency band, wherein the network infrastructure equipment comprises a controller unit and a transceiver unit configured to operate together to: transmit to the terminal device an indication of a plurality of potential configuration settings for the secondary component carrier; transmit to the terminal device an allocation message indicating an allocation of transmission resources to be used by for communicating data to the terminal device on the secondary component carrier; transmit to the terminal device in association with the allocation message an indication of a selected one of the plurality of potential configuration settings for the secondary component carrier to be used for communicating the data; and transmit the data to the terminal device using the allocated resources on the secondary component carrier operating in accordance with the selected one of the plurality of potential configuration settings.

Paragraph 28. Circuitry for network infrastructure equipment for use in a wireless telecommunications system for communicating with a terminal device on a primary cell supporting a primary component carrier on radio resources within a first frequency band and a secondary cell supporting a secondary component carrier on radio resources within a second frequency band, wherein the circuitry comprises a controller element and a transceiver element configured to operate together to: transmit to the terminal device an indication of a plurality of potential configuration settings for the secondary component carrier; transmit to the terminal device an allocation message indicating an allocation of transmission resources to be used by for communicating data to the terminal device on the secondary component carrier; transmit to the terminal device in association with the allocation message an indication of a selected one of the plurality of potential configuration settings for the secondary component carrier to be used for communicating the data; and transmit the data to the terminal device using the allocated resources on the secondary component carrier operating in accordance with the selected one of the plurality of potential configuration settings.

REFERENCES

[1] Holma H. and Toskala A, "LTE for UMTS OFDMA and SC-FDMA based radio access", John Wiley and Sons, 2009
[2] ETSI TS 136 211 V11.5.0 (2014-01)/3GPP TS 36.211 version 11.5.0 Release 11
[3] ETSI TS 136 212 V11.4.0 (2014-01)/3GPP TS 36.212 version 11.4.0 Release 11
[4] ETSI TS 136 213 V11.6.0 (2014-03)/3GPP TS 36.213 version 11.6.0 Release 11
[5] ETSI TS 136 321 V11.5.0 (2014-03)/3GPP TS 36.321 version 11.5.0 Release 11
[6] ETSI TS 136 331 V11.7.0 (2014-03)/3GPP TS 36.331 version 11.7.0 Release 11

What is claimed is:

1. A terminal device configured to operate in a wireless telecommunications system and for communicating on a primary cell supporting a primary component carrier on radio resources within a first, licensed frequency band and a secondary cell supporting a secondary component carrier on radio resources within a second, unlicensed frequency band, the terminal device comprising:
   circuitry configured to
      receive an allocation message indicating an allocation of transmission resources to be used for receiving data at the terminal device on the secondary component carrier;
      receive, in association with the allocation message, an indication of a selected one of a plurality of configuration settings for the secondary component carrier to be used for receiving the data, wherein the indication comprises a pointer to an entry in a table of potential configuration settings established according to an operating standard for the wireless telecommunications system; and
      receive the data using the allocated resources on the secondary component carrier operating in accordance with the selected one of the plurality of configuration settings, wherein
   communications between the wireless telecommunications system and the terminal device are made with a radio frame structure comprising a plurality of subframes, and the selected one of the plurality of configuration settings for the secondary component carrier is valid for one or more subframes.

2. The terminal device of claim 1, wherein the circuitry is configured to:
receive a further allocation message indicating a further allocation of transmission resources to be used for receiving further data at the terminal device on the secondary component carrier;
receive, in association with the further allocation message, a further indication of another selected one of the plurality of configuration settings for the secondary component carrier to be used for receiving the further data; and
receive the further data using the further allocated resources on the secondary component carrier operating in accordance with the other selected one of the plurality of configuration settings.

3. The terminal device of claim 1, wherein the allocation message includes the indication of the selected one of the plurality of configuration settings for the secondary component carrier to be used for communicating the data.

4. The terminal device of claim 1, wherein the indication of the selected one of the plurality of configuration settings for the secondary component carrier is specific to the associated allocation message.

5. The terminal device of claim 1, wherein the indication of the selected one of the plurality of configuration settings is associated with a plurality of allocation messages indicating allocations of transmission resources to be used for receiving data at the terminal device on the secondary component carrier.

6. The terminal device of claim 1, wherein the indication of the selected one of the plurality of configuration settings is received by the terminal device from the wireless telecommunications system using layer 1 signaling.

7. The terminal device of claim 1, wherein the indication of the selected one of the plurality of configuration settings is received in the same subframe as the allocation message with which it is associated.

8. The terminal device of claim 1, wherein the indication of the selected one of the plurality of configuration settings is received in a subframe that is before a subframe containing the allocation message with which it is associated.

9. The terminal device of claim 1, wherein the allocation message and the indication of a selected one of the plurality of configuration settings for the secondary component carrier are received using transmission resources in the first, licensed frequency band.

10. The terminal device of claim 1, wherein an indication of a plurality of configuration settings for the secondary component carrier are received using transmission resources in the first, licensed frequency band.

11. The terminal device of claim 1, wherein an indication of a plurality of configuration settings for the secondary component carrier are received using radio resource control (RRC) signaling.

12. The terminal device of claim 1, wherein the circuitry is configured to:
perform channel quality measurements for the secondary component carrier; and
convey an indication of the channel quality measurements to the wireless telecommunications system.

13. The terminal device of claim 1, wherein the second, unlicensed frequency band comprises radio resources which are shared with wireless communication devices that are not part of the wireless telecommunications system.

14. The terminal device of claim 1, wherein the circuitry is configured to:
make measurements of radio usage in the second, unlicensed frequency band and transmit an indication of the measurements of radio usage in the second, unlicensed frequency band to the wireless telecommunications system prior to receiving the indication of the selected one of the plurality of configuration settings for the secondary component carrier.

15. The terminal device of claim 14, wherein the indication of the measurements of radio usage in the second, unlicensed frequency band are transmitted using transmission resources in the first, licensed frequency band.

16. The terminal device of claim 14, wherein communications from the wireless telecommunication system are received by the terminal device operating in accordance with a first wireless communications standard and the measurements of radio usage in the second frequency band are made by the terminals device operating in accordance with a second wireless communications standard that is different from the first wireless communications standard.

17. The terminal device of claim 16, wherein the first wireless communications standard is a cellular telecommunications standard and the second wireless communications standard is a non-cellular telecommunications standard.

18. The terminal device of claim 14, wherein the indication of the measurements of radio usage in the second, unlicensed frequency band are transmitted using radio resource control (RRC) signaling.

19. The terminal device of claim 1, wherein the indication of the selected one of the plurality of configuration settings for the secondary component carrier comprises an indication of time resources to be used for the secondary component carrier.

20. A terminal device for use in a wireless telecommunications system for communicating on a primary cell supporting a primary component carrier on radio resources within a first, licensed frequency band and a secondary cell supporting a secondary component carrier on radio resources within a second, unlicensed frequency band, the terminal device comprising:
a controller and a transceiver configured to operate together to:
receive an allocation message indicating an allocation of transmission resources to be used for receiving data at the terminal device on the secondary component carrier;
receive, in association with the allocation message, an indication of a selected one of a plurality of configuration settings for the secondary component carrier to be used for receiving the data, wherein the indication comprises a pointer to an entry in a table of potential configuration settings established according to an operating standard for the wireless telecommunications system; and
receive the data using the allocated resources on the secondary component carrier operating in accordance with the selected one of the plurality of configuration settings, wherein
communications between the wireless telecommunications system and the terminal device are made with a radio frame structure comprising a plurality of subframes, and the selected one of the plurality of configuration settings for the secondary component carrier is valid for one or more subframes.

21. A method of operating a terminal device in a wireless telecommunications system for communicating on a primary cell supporting a primary component carrier on radio resources within a first, licensed frequency band and a secondary cell supporting a secondary component carrier on radio resources within a second, unlicensed frequency band, the method comprising:
  receiving an allocation message indicating an allocation of transmission resources to be used for receiving data at the terminal device on the secondary component carrier;
  receiving, in association with the allocation message, an indication of a selected one of a plurality of configuration settings for the secondary component carrier to be used for receiving the data, wherein the indication comprises a pointer to an entry in a table of potential configuration settings established according to an operating standard for the wireless telecommunications system; and
  receiving the data using the allocated resources on the secondary component carrier operating in accordance with the selected one of the plurality of configuration settings, wherein
  communications between the wireless telecommunications system and the terminal device are made with a radio frame structure comprising a plurality of subframes, and the selected one of the plurality of configuration settings for the secondary component carrier is valid for one or more subframes.

* * * * *